United States Patent [19]

Cripps

[11] Patent Number: 5,032,306
[45] Date of Patent: Jul. 16, 1991

[54] FLUORINATED HYDROCARBON LUBRICANTS FOR USE WITH REFRIGERANTS IN COMPRESSION REFRIGERATION

[75] Inventor: Harry N. Cripps, Hockessin, Del.

[73] Assignee: E. I. du Pont de Nemours and Company, Wilmington, Del.

[21] Appl. No.: 555,193

[22] Filed: Jul. 20, 1990

Related U.S. Application Data

[63] Continuation-in-part of Ser. No. 403,885, Sep. 7, 1989, abandoned.

[51] Int. Cl.$^5$ .................... C09K 5/00; C10M 107/00
[52] U.S. Cl. ......................................... 252/68; 252/70; 252/71; 252/52 R; 252/54; 252/58; 252/67; 252/47.5
[58] Field of Search ................... 252/70, 71, 52 R, 54, 252/58, 67, 68, 47.5

[56] References Cited

U.S. PATENT DOCUMENTS

| | | | |
|---|---|---|---|
| 4,248,726 | 2/1981 | Uchinuma et al. | 252/52 |
| 4,267,064 | 5/1981 | Sasaki et al. | 252/52 A |
| 4,755,316 | 7/1988 | Magid et al. | 252/68 |
| 4,851,144 | 7/1989 | McGraw et al. | 252/52 A |
| 4,877,557 | 10/1989 | Kaneshige et al. | 252/47.5 |
| 4,900,463 | 2/1990 | Thomas et al. | 252/54 |

*Primary Examiner*—Prince E. Willis
*Assistant Examiner*—J. Silbermann

[57] ABSTRACT

A blend of refrigerant with at least one fluorinated hydrocarbon, comprising at least one graft of a perfluoroalkene or a perfluoroalkylvinyl ether onto at least one hydrocarbon having at least four (4) carbon atoms, the number of carbon atoms in the hydrocarbon and the number of grafts of the perfluoro compound being such as to provide a lubricant which has an SUS viscosity at 100° F. of at least 50 and a pour point of less than about −10° C. is disclosed for use in compression refrigeration.

8 Claims, No Drawings

FLUORINATED HYDROCARBON LUBRICANTS FOR USE WITH REFRIGERANTS IN COMPRESSION REFRIGERATION

CROSS-REFERENCE TO RELATED APPLICATION

This application is a continuation-in-art of U.S. application Ser. No. 07/403,885 filed Sept. 7, 1989 now abandoned.

FIELD OF INVENTION

This invention relates to lubricants used with refrigerants in compression refrigeration and air-conditioning systems. More particularly, it relates to lubricants for use with saturated hydrocarbons having 1-4 carbon atoms that are partially or fully substituted with at least one atom of chlorine or flourine, and have a normal boiling point of −80° C. to +50° C. Specifically, this invention relates to lubricants for use with tetrafluoroethanes, e.g. 1,1,1,2-Tetrafluoroethane (HFC-134a), and 1,1,2,2-Tetrafluoroethane (HFC-134), etc. and of lesser importance, pentafluoroethane (HFC-125). These compounds are being considered as replacements for dichlorodifluoromethane (CFC-12), particularly in automotive air conditioning systems. The lubricants of this invention are not only completely miscible over the full operating temperature range for automotive air-conditioning with HFC-134a and the like, but are also completely miscible with CFC-12 over this range. Hence, they may be used with CFC-12 in the same systems during the transition from CFC-12 to HFC-134a.

BACKGROUND OF INVENTION

Refrigeration systems that use CFC-12 as the refrigerant generally use mineral oils to lubricate the compressor. (See for example the discussion in Chapter 32 of the 1980 ASHRAE Systems Handbook.) CFC-12 is completely miscible with such oils throughout the entire range of refrigeration system temperatures, i.e. −45° C. to 65° C. In automotive air-conditioning, paraffinic and naphthenic oils of about 500 SUS viscosity at 100° F. are usually used with CFC-12. These oils have "pour points" below −20° C. and viscosities of about 55 SUS at 210° F. and are completely miscible with the CFC-12 refrigerant over the range of temperatures from −10° C. to 100° C. Consequently, oil which dissolves in the refrigerant travels through the refrigeration loop in the air conditioning system and returns with the refrigerant to the compressor. It does not separate during condensation, although it may accumulate because of the low temperature when the refrigerant is evaporated. At the same time, this oil which lubricates the compressor will contain some refrigerant which, in turn, may affect its lubricating properties.

When substituting HFC-134a, HFC-134, or mixtures thereof for CFC-12 in these refrigeration systems, it would be desirable to be able to use the same oils as used with CFC-12. It would not require any substantial change in equipment nor any significant changes in conditions used for the system. If lubricant separates from refrigerant during operation of the system, serious problems may result, i.e. the compressor could be inadequately lubricated. This would be most serious in automotive air-conditioning systems because the compressors are not separately lubricated and a mixture of refrigerant and lubricant circulate throughout the entire system. Unfortunately, however, the mineral oils are substantially immiscible with the tetrafluoroethanes.

Two recent publications of ASHRAE discuss the problems associated with separation of lubricants and refrigerants. These are "Fundamentals of Lubrication in Refrigerating Systems and Heat Pumps" Kruse and Schroeder ASHRAE Transactions Vol. 90 Part 2B, pps. 763–782, 1984 and "Evaluation of Lubricants for Refrigeration and Air-Conditioning Compressors", Spauschus, ibid pps. 784–798.

In summary, refrigerants which are not completely miscible with an oil in the full range of mixture compositions and operating temperatures may become miscible or immiscible as the temperature is raised or lowered from room temperature. The areas of immiscibility may assume a variety of shapes, i.e. parabolic or non-parabolic. As a parabola, the curve of miscibility temperature vs. percent oil in the mixture, may have its open or concave portion facing the low or high temperatures. The closed or convex-portion of the parabolic curve identifies, respectively, the maximum or minimum temperature above or below which the refrigerant and the lubricating oil are completely miscible. These temperatures are referred to as the maximum or minimum "consolute temperatures." Beside parabolas, these curves can assume skewed parabolic shapes or curves of varying slope wherein immiscibility occurs above or below the curve.

One of the objects of this invention is to provide a combination of lubricating oil and refrigerant such as tetrafluoroethane, e.g. HFC-134a, where the area of miscibility encompasses the full range of temperature and composition encountered in compression refrigeration, i.e. complete miscibility occurs for all compositions in the range of −45° C. to at least 20° C., preferably to 100° C., the critical temperature of HFC-134a. Another object is to provide a process for using such compositions in compression refrigeration.

PRIOR ART

U.S. Pat. No. 4,248,726, issued Feb. 5, 1981, and U.S. Pat. No. 4,267,064, issued May 12, 1981, both to Nippon Oil Company et al, relate to the use of a polyglycol oil such as polyoxypropylene glycol (or an alkyl ether thereof) having a viscosity index of at least 150 and a glycidyl ether type epoxy compound as a high viscosity refrigeration oil composition for halogen-containing refrigerants. These polyglycol/glycidyl ether compositions are disclosed for use with Freon ® 11, 12, 13, 22, 113, 114, 500 and 502; and as being "particularly effective" with Freon ® 12 or 22.

Research Disclosure 17486 entitled "Refrigeration Oil" by E. I. du Pont de Nemours and Company discloses polyalkylene glycols such as Ucon ® LB-165 and Ucon ® LB-525 sold by Union Carbide Corporation, for use with HFC-134a. These glycols are polyoxypropylene glycols that are mono-functional and are prepared from propylene oxide initiated with n-butanol. The publication states that these combinations of oil and refrigerant are miscible in all proportions at temperatures at least as low as −50° C. and are thermally stable in the presence of steel, copper and aluminum at 175° C. for about six days.

U.S. Pat. No. 4,755,316, issued July 5, 1988, to Allied-Signal Inc. also relates to the use of polyalkylene glycols. However, these glycols are at least difunctional with respect to hydroxyl groups and contain at least 80% propylene oxide units relative to the total, the remaining 20% may derive from ethylene or butylene oxide or esters, olefins and the like which are polymerizable with propylene oxide. It should be noted that only 100% oxypropylene units in the difunctional PAGs are exemplified in this patent.

SUMMARY OF INVENTION

The present invention is based on the discovery that the use of a sufficient amount to lubricate, usually 10–20% by volume for automotive use, and in some situations as high as 50% by volume, of at least one fluorinated hydrocarbon comprising at least one graft of a perfluoroalkene or a perfluorovinyl ether onto at least one hydrocarbon, preferably an alkane, the alkane having at least four (4) carbon atoms, the number of carbon atoms in the alkane and the number of grafts of the perfluoro compound being such as to provide a lubricant, the lubricant having an SUS viscosity at 100° F. of at least 50 and a pour point of less than about $-10°$ C., hereafter referred to as an "HFC oil," with usually 80–90% by volume at least one of the tetrafluoroethanes, HFC-134 and HFC-134a, the pentafluoroethane, HFC-125, and any other saturated hydrocarbon having 1–4 carbon atoms that is partially or fully substituted with at least one atom of chlorine or fluorine and a normal boiling point of $-80°$ C. to $+50°$ C., will be completely miscible in one another in the range of temperatures from $-40°$ C. to at least 20° C., preferably to 100° C., the critical temperature of HFC-134a.

The preferred HFC oils of this invention may be structurally defined as at least one selected from the group consisting of

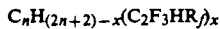
$$C_nH_{(2n+2)-x}(C_2F_3HR_f)_x$$

and
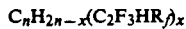
$$C_nH_{2n-x}(C_2F_3HR_f)_x$$

wherein $R_f$ is $C_mF_{2m+1}$ or $C_mF_{2m+1}O$, m being 1 to 4;

n is an integer of at least 4, preferably 6 to about 20; and x is an integer of at least 1, preferably 1 to 4. They provide a lubricant having an SUS viscosity at 100° F. of at least 50 and a pour point of less than about $-10°$ C.

The weight ratio of refrigerant to the lubricant, the "HFC oil", may be anywhere from 99/1 to 1/99, preferably 99/1 to 70/30. The viscosity of these oils may range from 50 to 3000 SUS at 100° F., but for most commericial uses, from 100 to 1200 SUS at 100° F.

It is known that the use of an appropriate amount of an "extreme pressure (EP) additive" improves the lubricity and load-bearing characteristics of oils and, thus, would improve the quality of the refrigerant-lubricant compositions. EP additives for use in the invention are included among those disclosed in Table D of U.S. Pat. No. 4,755,316. A preferred one is an organic phosphate; SYN-O-AD ® 8478, a 70%/30% blend of tri (2,4,6-tri-t-butyl phenyl) phosphate/triphenyl phosphate, manufactured by AKZO.

EP additives may also be used in conjunction with some of the antiwear additives, oxidation and thermal stability improvers, corrosion inhibitors, viscosity index improvers, detergents and anti-foaming agents disclosed in Table D of U.S. Pat. No. 4,755,316. These additives may also be partially or fully fluorinated.

DESCRIPTION OF PREFERRED EMBODIMENTS

As stated previously, the tetrafluoroethanes, e.g. HFC-134a, HFC-134 and the pentafluoroethane, HFC-125, particularly HFC-134a have physical characteristics which allow substitution for CFC-12 with only a minimum of equipment changes in compression refrigeration. They could be blended with each other, as well as with other refrigerants, including CFC-12($CCl_2F_2$), HCFC-22($CHClF_2$), HFC-152a($CH_3CHF_2$), HCFC-124($CHClFCF_3$), HCFC-124a($CHF_2CClF_2$), HCFC-142b($CH_3CClF_2$), HFC-32($CH_2F_2$), HFC-143a($CH_3CF_3$), HFC-143($CHF_2CH_2F$), and FC-218 ($CF_3CF_2CF_3$); and for purposes of the present invention such blends are not excluded. However, only those blends of tetrafluoroethane or pentafluoroethane with other refrigerants which are miscible with the lubricants of this invention in the range of $-40°$ C. to about $+20°$ C. are included.

HFC-134a, the preferred tetrafluoroethane refrigerant, may be prepared by any of the methods disclosed in the prior art; e.g., U.S. Pat. No. 2,745,886; 2,887,427; 4,129,603; 4,158,675; 4,311,863; 4,792,643 and British 1,578,933 and 2,030,981.

The preferred HFC oils are grafts (one to four grafts) of hexafluoropropylene to a normal alkane or cycloalkane, the alkane having anywhere from 8 to 12 carbon atoms.

The HFC oils may be prepared by reacting the alkane with a fluorinated compound having any of the following formulas, where $R_f$ is $CnF_{2n+1}$:

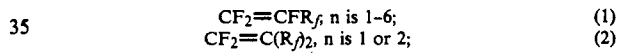

$$CF_2=CFR_f, \text{ n is 1–6};  \qquad (1)$$
$$CF_2=C(R_f)_2, \text{ n is 1 or 2};  \qquad (2)$$

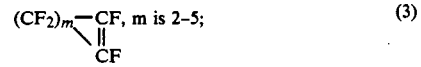

$$(CF_2)_m\underset{CF}{\overset{\displaystyle -CF}{\diagdown\,\|}}, \text{ m is 2–5};  \qquad (3)$$

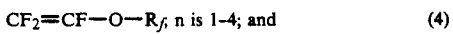

$$CF_2=CF-O-R_f, \text{ n is 1–4; and}  \qquad (4)$$

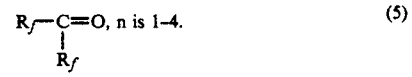

$$R_f-\underset{R_f}{\overset{\displaystyle |}{C}}=O, \text{ n is 1–4}.  \qquad (5)$$

The reaction is initiated by free radicals generated by decomposition of conventional free radical generators such as those disclosed in U.S. Pat. No. 2,958,707.

The preferred fluoro compounds for use as grafts in preparing the lubricants of this invention are hexafluoropropylene, perfluoro methyl vinyl ether and perfluoro n-propyl vinyl ether.

The HFC oils may be varied to yield viscosities ranging from 50 to 3000 SUS at 100° F. They may be blended with each other and with other lubricants, e.g. perfluorocarbons, other hydrofluorocarbons, naphthenic, paraffinic, alkylbenzenes, polyalkyl benzenes, etc., to modify viscosity and/or lubrication properties.

Specifically, the lubricants used in the compositions of the invention, and in the invented method for providing lubrication in compression refrigeration and air-conditioning equipment have the following characteristics:

Viscosity at 100° F.

50 to 3000 SUS, preferably 100 to 1200 SUS, particularly about 500 SUS for automotive air-conditioning Pour Point $-10$ C., preferably below $-15°$ C. for the 100 SUS and 500 SUS oils.

Solubility or miscibility range

100% from 100° C. to less than −40° C. for 1–99 weight percent of HFC-134a in mixture with the HFC lubricant of 100° F. viscosities of 50 SUS to 2500 SUS.

Four-ball wear test with a specific set of steel balls. Scar wear and coefficient of friction equal to or slightly higher than that for the oils currently used with CFC-12 in automotive air-conditioning, i.e., 0.37 mm scar wear and 0.07 friction coefficient when saturated with CFC-12 at atmospheric pressure.

"Falex" (load failure) test with a specific type of steel for the V-block and pin. The fail load equal to or greater than that for the CFC/refrigerant oil combinations, i.e., 1300 lbs. when saturated with CFC-12 at atmospheric pressure.

1 Solubility of Refrigerant in Lubricants

Six ml. blends of refrigerant and lubricant were used for the solubility studies. Generally, the mixtures contained 30, 60 and 90 wt. % refrigerant. These air-free mixtures were contained in sealed Pyrex ® tubes (7/16" I.D.×5.5", ca. 12.5 cc capacity). The refrigerant/lubricant solubilities were determined by completely immersing the tube in a bath at each test temperature for a minimum of 15 minutes and providing agitation to facilitate mixing and equilibration. The accuracy of determining the temperatures when the refrigerant/lubricant blend became either miscible or immiscible was about +2° C. The refrigerant/lubricant blends were called immiscible when the blend acquired and retained "schlieren" lines; formed floc; became cloudy o formed two liquid layers. These solubility tests were run from 93° to −50° C. Tests were not run above 93° C. for safety reasons. It is assumed that if the blend of HFC-134a/oil is soluble to 93° C., it will still be soluble at 100.5° C., the critical temperature of HFC-134a.

2. Stability of Refrigerant and Lubricant

Three ml. of refrigerant and 0.3 ml. of lubricant plus coupons (steel 1010/copper/aluminum 1100−2 ⅜"×¼"×1/16", 120-grit surface finish) were charged and sealed in a Pyrex ® tube (7/16" I.D.×5.5", ca. 12.5 cc volume) under anaerobic conditions. The specimens were tied together at the top end with copper wire with copper-wire rings between the metals to separate the metals at the top end. The tubes were stored vertically at 268° F. for 11.8 days. Afterwards, the tube contents were examined for appearance changes. These changes were assigned effect ratings: 0—no change; 1—slight acceptable change; 2—borderline change; 3—slight unacceptable change; and 4—moderate unacceptable change.

The refrigerants were then transferred to gas-sampling bulbs for analysis by gas chromatography for the decomposition products of the refrigerant i.e., HFC-143a (a decomposition product of HFC-134a) or HCFC-22 (CFC-12 decomposition product). These results were then converted to their equivalents in terms of HF and HCl generated.

3. Lubricity a. Four-ball Wear Test

The procedure is described fully in ASTM D4172. The method was modified as follows: A load of 20 Kg at 1200 RPM was put on the steel 52100 balls immersed in 10 ml. of lubricant at 225° F. for 60 minutes. The refrigerant, HFC-134a or CFC-12, was bubbled through a Teflon ® capillary tube into the lubricant at the rate of 0.75 standard cu. ft./hr. to provide one atmosphere of pressure of refrigerant gas over the lubricant and a gas-saturated lubricant.

b. Falex Pin/V-Block Load-to-Failure Test

The procedure is described fully in ASTM D3233. The V-Block Was made of AISI C-1137 steel (HRC-20 to 24 hardness, 5 to 10 microinches surface finish). The test pin was made of AISI 3135 steel (HRB-87 to 91 hardness, 5 to 10 microinches surface finish). These tests were run with refrigerant gas bubbling through the oil as in the "Four-ball Wear Test".

4. Viscosity and Viscosity Slope a. Viscosity is a property that defines a fluid's resistance to shearing force. It is expressed in terms of absolute viscosity, kinematic viscosity or Saybolt Seconds Universal viscosity (SSU), depending on the method by which it is determined. Conversion from SSU to mm$^2$/s (centistokes) can be readily made from tables contained in ASTM D-445, but it is necessary to know the density to convert kinematic viscosity to absolute viscosity. Refrigeration oils are sold in viscosity grades, and ASTM has proposed a system of standardized viscosity grades for industry-wide usage (D-2422).

Viscosity decreases as the temperature increases; and increases as the temperature decreases. The relationship between temperature and kinematic viscosity is represented by:

$$\log \log (v+0.7) = A + B \log T \quad \text{(Equation 1)}$$

where $v$ = kinematic viscosity, mm$^2$/s (CST)

$T$ = thermodynamic temperature (kelvin)

$A, B$ = constants for each oil

This relationship is the basis for the viscosity temperature charts published by ASTM and permits a straight line plot of viscosity over a wide temperature range. This plot is applicable over the temperature range in which the oils are homogeneous liquids.

b. Viscosity Slope is a measure of the amount of change in viscosity experienced by an oil with change in temperature. This ratio is "B" in Equation 1 above; and is usually different for different oils.

5. Pour Point

Any oil intended for low temperature service should be able to flow at the lowest temperature likely to be encountered. The procedure for determining pour point is described in ASTM D-97.

The invention will be more clearly understood by referring to the examples and controls which follow:

Example 1

Grafting of Hexafluoropropylene, HFP, to n-Decane and Testing for Solubility with HFC-134a A 400 ml. pressure vessel was charged with 2.0 g. di-t-butyl peroxide, and 50.0 g. of nitrogen-saturated n-decane. The vessel was closed, cooled in a dry ice-acetone bath and evacuated. HFP, 200 g., was added and the vessel closed. The vessel was placed in a shaking apparatus and heated at 140°–147° C. for 12 hours under autogeneous pressure. During this period the pressure decreased from ca. 2066 to 1665 psig. The vessel was cooled to ambient temperature and the gaseous products vented. The liquid products consisted of two clear layers. The upper layer, 31.8g. was a clear mobile liquid which was primarily unreacted n-decane and the lower layer, 83.4 g., was a clear viscous mixture of hexafluoropropylene grafts to n-decane.

The lower layer was stripped of lower boiling materials by distillation ca. 8.6 g. b.p. ca. 25°–59° C./0.4 Torr.

The viscous residue, 74.8 g., was distilled in a short path distillation apparatus and two fractions collected.

| Fraction # | Bath T (°C.) | Pressure (Torr.) | Weight (g) |
|---|---|---|---|
| 1 | 107-116 | 0.2-0.09 | 60.5 |
| 2 | 116-118 | 0.2-0.09 | 5.52 |

Both fractions were clear viscous oils. Elemental analysis in weight % was: C, 36.61, 36.84; H, 3.17, 3.03; F (diff) 60.18, of fraction #1 indicated that ca. 3.8 hexafluoropropylene molecules were grafted to the n-decane. The composition and structure of the graft was confirmed by proton magnetic resonance spectra. The resonance peaks for the hydrogen next to fluorine appears primarily as an ill-defined multiplet at ca. 4.85 ppm and much less intense resonances at ca. 5.4 to 6.2 ppm (solution in Deuterochloroform with Tetramethyl silane). Broad ill-defined resonances for other protons are present at 0.8-2.7 ppm.

The number of total HFP grafts, $C_3F_6H$, for fraction #1 calculated from the sum of relative areas of the resonances in the 4.85 and 5.4-6.2 region and the total area for all hydrogens in the molecule. Fraction #1 had ca. 3.6 $C_3F_6$ grafts per decane molecule which is in fair agreement with the elemental analysis data.

Total area = 98.5 Arbitrary units
$C_3F_6H$ area = 16.0 Arbitrary units $$\text{HFP/Decane} = \frac{16 \times 22}{98.5} = 3.6$$

The $C_3F_6H$ grafts have fluorine magnetic resonance peaks at ca. 75 ppm., $CF_3$ (Rel. Intensity 3), ca. 110-125 ppm., $CF_2$ (Rel. Intensity 2) and ca. 210 ppm., CF (Rel. Intensity 1) in deuterochloroform ($CCl_3F=0$).

Fraction #1 was soluble in HFC-134a throughout the concentration and temperature ranges expected in the refrigeration cycle.

| Concentration HFC-134a/Fr #1 Wt. % | | Temperature Range (°C.) | |
|---|---|---|---|
| | | Miscible | Haze |
| 30 | 70 | 93 to −35 | −35 to −50 |
| 60 | 40 | 93 to −45 | — |
| 90 | 10 | 93 to −35 | −35 to −50 |

A portion of fraction #2 (HFC oil) was checked for stability at 268° F. for 11.8 days, as a representative of this kind of oil, in contact with HFC-134a plus steel-1010, copper and aluminum. The results show this combination is more stable than the commercially used combinations of oils (#1-naphthenic, #2-paraffinic) with CFC-12.

| Refrigerant | Oil | Cl— or F—* Generated (ppm) | Visual-Effect Rating | | | |
|---|---|---|---|---|---|---|
| | | | Liquid | Steel | Cu | Al |
| 134a | HFC | 2* | 0 | 0 | 0 | 0 |
| 12 | #1 | 423 | 4(a) | 3(b) | 2(c) | 2(d) |
| 12 | #2 | — | 0 | 3(b) | 0 | 0 |

(a) Brown color plus moderate black precipitate
(b) Brown deposit/gray film - 25/75% of surface plus moderate deposit of solids at liquid-gas interface (LGI).
(c) Dark tarnish - 25% plus moderate deposit at LGI.
(d) Very slight etched plus moderate deposit at LGI.
(e) Slight copper plating plus gray film - 100% of surface.

EXAMPLE 2

Grafting of Hexafluoropropylene, HFP, n-Dodecane and Testing for Solubility with HFC-134a A 400 ml. pressure vessel was charged with 2.0 g. di-t-butylperoxide, 47.0 g. of nitrogen saturated n-dodecane. The vessel was closed and cooled in a dry ice-acetone bath. The cold evacuated vessel was charged with 200 g. of hexafluoropropylene, HFP. The vessel was placed in a shaking apparatus and heated to 139°-1° C. under autogeneous pressure for 12 hours. The observed pressure drop at the operating temperature was about 725 psi. (2286-1561 psig.). The reaction vessel was cooled and unreacted gaseous material, HFP, vented.

The liquid product in the reaction vessel consisted of two clear colorless layers. The upper layer, 21.8 g., was essentially unreacted dodecane as judged by gas chromatographic analysis. The lower layer, 102.9 g., was much more viscous than the upper layer. The lower layer was concentrated in a rotary evaporator at a bath temperature of ca. 40° C. under vacuum (water aspirator). The residue, 98.2 g., was distilled under reduced pressure. A viscous fraction, 69.9 g., b. p. 136°-163° C. at 0.07-0.09 Torr. was collected. Elemental analysis in weight % was:

C, 36.10, H, 2.98, F,64.38 (sic) Elemental analysis indicates ca. 4.5 HFP Grafts/Dodecane molecule. The proton NMR spectrum gives 4.5 HFP/Dodecane (See Example 1).

The oil was found to be soluble in HFC-134a also.

| Concentration HFC-134a (wt %) | Temperature Range (°C.) | |
|---|---|---|
| | Miscible | Haze |
| 30 | 93 to −13 | −13 to −40 |
| 60 | 93 to −23 | −35 to −43 |
| 90 | 93 to −35 | −35 to −43 |

EXAMPLE 3

Grafting of Hexafluoropropylene, HFP, to n-Dodecane and Testing for Viscosity

A series of reactions as described in Example 1 were run with the results as tabulated below:

| Expt. # | (1) DTB (g) | (2) DD (g) | HFP (g) | Temp. (°C.) | Time (hrs) | (3) U (g) | (4) L (g) |
|---|---|---|---|---|---|---|---|
| 1 | 2.5 | 47 | 200 | 140 | 14 | 22.1 | 106.8 |
| 2 | 2.5 | 47 | 200 | 140 | 14 | 24.2 | 108.5 |
| 3 | 2.5 | 42 | 180 | 140 | 14 | 17.2 | 104.8 |
| 4 | 2.5 | 47 | 200 | 140 | 14 | 20.0 | 113.4 |
| 5 | 2.5 | 47 | 200 | 140 | 14 | 23.2 | 113.2 |
| 6 | 2.5 | 47 | 200 | 140 | 14 | 21.5 | 122.8 |

-continued

| Expt. # | (1) DTB (g) | (2) DD (g) | HFP (g) | Temp. (°C.) | Time (hrs) | (3) U (g) | (4) L (g) |
|---|---|---|---|---|---|---|---|
| 7 | 2.0 | 39 | 180 | 140 | 14 | 13.7 | 82.3 |

(1)di-t-butyl peroxide
(2)Dodecane
(3)upper layer
(4)lower layer

The combined lower layers, 736.5 g., A, were stripped of "volatiles", ca. 72.7 g., by distillation under vacuum (b.p. ca 26°–76° C./760–0.4 Torr). A portion, 610.5 g., of the residue, B, (662.3 g.) was distilled in vacuo and the following fractions collected.

| Fraction # | Boiling Pt. °C./Torr | Wt. (g) | Mol Ratio HFP/DD* | Visual Viscosities |
|---|---|---|---|---|
| 1 | 75–126/0.08 | 187.0 | 3.6 | Increasing |
| 2 | 126–128/0.08 | 229.7 | 4.4 | " |
| 3 | ca 128/0.08 | 49.5 | 4.8 | " |
| 4 | 7128/0.08 | 59.1 | 4.7 | " |

*Molecules of HFP/Dodecane calculated from proton magnetic resonance spectrum.

Fractions 2, 3, 4 were combined to give a composite oil, C. Analytical data on B and C and Fraction #1 were obtained.

| Sample | Elemental Analysis (wt %) | | | HFP Content(2) | | Mole Ratio HFP/DD | | d (g/cc) | Mn(4) |
|---|---|---|---|---|---|---|---|---|---|
| | C | H | F(1) | Wt % | Mole % | C(2) | HNMR(3) | | |
| B | 37.41 | 2.77 | 59.82 | 78.3 | 80.4 | 4.1 | 3.9 | 1.547 | 902 |
| C | 36.07 | 2.79 | 61.14 | 80.1 | 82.2 | 4.6 | 4.4 | 1.517 | 917 |
| FrI | 38.21 | 3.05 | 58.74 | 76.6 | 78.8 | 3.7 | 3.4 | 1.470 | 788 |

(1)100 − (% C + % H)
(2)calculated from carbon analysis
(3)calculated from proton magnetic resonance spectrum
(4)Number average molecular weight from vapor phase osmometry in toluene with polystyrene standards.

B, C and even Fraction 190 1 displayed viscosities that make them useful as lubricants, as shown below:

| Sample | Viscosity @ 100° F. | |
|---|---|---|
| | (cSt.) | (SUS) |
| Fr. # 1 | 82.0 | 380 |
| B | 247.9 | 1149 |
| C | 371 | 1719 |

A one liter pressure vessel, charged with 150 g. of n-decane, 600 g. of HFP and 6.0 g. of di-t-butyl peroxide, was heated under autogeneous pressure for 12 hours and cooled. The pressure was bled off and the liquid products isolated as in Example 1. Three such runs gave the following products:

| Run | Upper Layer(a) (g) | Lower Layer(b) (g) | Concentrate(c) (g) |
|---|---|---|---|
| A | 84.3 | 272.4 | 251.5 |
| B | 90.0 | 283.6 | 258.4 |
| C | 87.5 | 282.2 | 257.4 |

(a)Clear mobile liquids; Essentially unreacted decane by GC analysis.
(b)Clear or pale yellow viscous liquids
(c)Lower layer stripped in rotary evaporator to remove dissolved volatiles; primarily n-decane A portion (749 g.) of the combined concentrates from runs A, B, and C was distilled in vacuo.

| Fraction # | Boiling Range (°C./Torr.) | Wt (g) | HFP/D* Mol Ratio |
|---|---|---|---|
| 1 | 27–78/0.075 | 25.6 | — |
| 2 | 78–100/0.08–0.1 | 65.7 | 3.05 |
| 3 | 101–107/0.1–0.075 | 286.3 | 3.68 |
| 4 | 110/0.07 | 129.6 | 4.07 |
| 5 | 110–116/0.07 | 123.2 | 4.22 |
| Residue | — | 67.9 | — |

*Calculated from proton magnetic resonance spectra as in Example 1.

The concentrate and blends of selected fractions from this and similar runs had the following composition and properties.

| Sample | Origin | Composition(wt. %) | | | Mole Ratio HFP/D(8) | | d (g/cc) | Mn(7) (g/mole) |
|---|---|---|---|---|---|---|---|---|
| | | C | H | F(4) | C(5) | NMR(6) | | |
| A | Blend(1) | 36.66 | 2.60 | 60.74 | 3.6 | 3.7 | 1.535 | 917 |
| B | Blend(2) | 36.76 | 3.06 | 60.18 | 3.5 | 3.3 | 1.475 | 788 |
| C | Blend(3) | 36.91 | 3.29 | 59.80 | 3.5 | 3.8 | 1.510 | 902 |

(1)Fractions like 3, 4, 5 (preceding table) b.p. ca 100–138°/0.07–0.08 Torr.
(2)Fractions like 2 (preceding table) b.p. ca. 75–102° C./0.08 Torr.
(3)Concentrate (preceding Table)
(4)100 − (% C + % H)
(5)Calculated from % C
(6)Calculated from proton nuclear magnetic resonance spectrum
(7)Number average molecular weight measured by Vapor Phase Osmometry in toluene at 50° C with polystyrene standard.
(8)HFP/D Average Hexafluoropropylene grafts per decane molecule.

The viscosities of the blends, A and B, and the concentrate C were measured. As shown below, the viscosities were in the range that would make them useful as lubricants.

| Sample | Viscosity @ 100° F. | |
|---|---|---|
| | cSt(1) | SUS(2) |
| A | 111.9 | 519 |
| B | 38.8 | 181.3 |

-continued

| Sample | Viscosity @ 100° F. | |
|---|---|---|
|  | cSt[1] | SUS[2] |
| C | 91.0 | 422 |

[1]Centistokes
[2]Saybolt Universal Seconds

EXAMPLE 5

Grafting of HFP to n-Octane

The procedure of Example 3 was repeated except the n-decane was replaced with 150 g. of n-octane. The liquid products consisted of two layers: upper layer, A, (98.4g), of primarily unreacted n-octane and the lower graft layer, B, (234.0 g). Layer B was distilled under reduced pressure and a lightly viscous fraction, C, b.p. 65°–87° C./0.07–0.075 Torr, was collected. It had the following composition and properties:

| (Composition wt %) | | | HFP/O Mol Ratio[2] | | d | | 100° F. Viscosity | |
|---|---|---|---|---|---|---|---|---|
| C | H | F[1] | C[3] | NMR[4] | (g/cc) | Mn[5] | cSt[6] | SUS[7] |
| 36.66 | 2.78 | 60.56 | 2.9 | 3.1 | 1.511 | 628 | 62.2 | 124.6 |

[1]Calculated from 100 − (% C + % H)
[2]Hexafluoropropylene grafts/Octane molecule
[3]Calculated from % C
[4]Calculated from Proton Magnetic Resonance Spectrum
[5]Number average molecular weight by VPO
[6]Centistokes
[7]Saybolt Universal Seconds The HFC oils made in the preceeding examples can be blended in all proportions to get oils of any desired viscosity. Illustrative of this is the preparation of oils in the ca 118 cSt. (ca. 500 SUS) @100° F. range obtained by blending some of the previously described 100–1200 SUS oils. Oils in this viscosity range are commonly used in automotive air conditioners.

The following table, Table 1, shows the properties of a number of blends, A, B, C, and D, made from oils described in Examples 3, 4, and 5 as well as the properties of an "unblended" oil, E.

The oils have low pour points and excellent lubricating properties as shown by 4-ball wear.

EXAMPLE 6

Grafting of Hexafluoropropylene, HFP, to Cyclooctane (CO) and Testing Solubility with HFC-134a The procedure of Example 1 was used with 2.0 g. di-t-butyl peroxide, 60 g. cyclooctane and 200 g. of HFP. The mixture was heated at 135° C. for 12 hours under autogeneous pressure. After cooling and venting the unreacted HFP, the product obtained was a clear viscous oil (202.5 g.). It was distilled under reduced pressure.

| Fraction # | B.P. (°C./Torr) | Wt. (g) | Appearance |
|---|---|---|---|
| 1 | 46–91/15 | 6.4 | Mobile liquid |
| 2 | 85–93/15 | 15.8 | " |
| 3 | 84–91/15 | 10.4 | " |
| 4 | 93–101/15–4.5 | 10.8 | " |
| 5 | 103–108/4.5 | 11.6 | Viscous Oil |
| 6 | 65–66/0.08 | 14.0 | " |
| 7 | 65–67/0.08 | 51.9 | " |
| 8 | 71.5–90.3/0.09 | 11.1 | " |
| 9 | 80.1–90.3/0.09 | 9.2 | " |
| 10 | ca. 93/0.09 | 32.8 | More viscous oil |

Elemental Analysis and proton magnetic reasonance spectra indicated that Fraction #2 had approximately one HFP/Cyclooctane, CO; Fraction #6 had approximately 1.9 HFP/CO; and Fraction #10, approximately 3 HFP/CO.

| Fraction | Elemental Anal. (wt %) | | | HFP/CO Mol Ratio | |
|---|---|---|---|---|---|
|  | C | H | F | C[c] | NMR[d] |
| 2 | 50.49 | 5.79 | 44.36[a] | 0.99 | 1.0 |
| 6 | 41.48 | 3.48 | (55.04)[b] | 1.89 | 1.8 |
| 10 | 36.22 | 2.72 | (61.06)[b] | 3.03 | 2.9 |

[a]Found
[b]100 − (% C + % H)
[c]Calculated from % C
[d]Calculated from proton magnetic resonance spectrum; Relative area of ca 4.9 doublet divided by Relative area of all peaks divided by 16.

The viscous oils, Fractions 7 and 10, were soluble in HFC 134a. Fractions 8 and 9 were not tested but are expected to be soluble.

TABLE I

HFP/n-ALKANE GRAFTED POLYMER OILS
550 SUS (118 cSt) OIL DATA

| SAMPLE NO. | COMPOSITION | | wt. % | VISCOSITY cSt | | ASTM SLOPE | POUR POINT °C. | 4-BALL WEAR* | |
|---|---|---|---|---|---|---|---|---|---|
|  | Ex. | oil |  | 100° F. | 210° F. |  |  | SCAR mm | COEFF. OF FRICTION |
| A+ | 3 | C | 63.41 | 120.37 | 5.44 | 1.084 | −15 | 0.38 | 0.08 |
|  | 5 | C | 36.59 |  |  |  |  |  |  |
| B+ | 3 | C | 54.95 | 118.28 | 5.51 | 1.071 | −15 | 0.39 | 0.08 |
|  | 4 | B | 45.04 |  |  |  |  |  |  |
| C+ | 3 | C | 46.93 | 119.33 | 5.35 | 1.090 | −15 | 0.41 | 0.08 |
|  | 4 | A | 26.07 |  |  |  |  |  |  |
|  | 5 | C | 27.00 |  |  |  |  |  |  |
| D+ | 3 | C | 41.10 | 117.31 | 5.36 | 1.085 | −15 | 0.36 | 0.08 |
|  | 4 | A | 31.70 |  |  |  |  |  |  |
|  | 5 | C | 12.20 |  |  |  |  |  |  |
|  | 4 | B | 15.00 |  |  |  |  |  |  |
| Ex. | 4 | A | 100.00 | 111.90 | 5.12 | 1.099 | −15 | 0.41 | 0.08 |

*20 Kg/225° F./1200 RPM/60 MINUTES
+ Blended Oils
Ex = Example

| Concentration | | Miscible Range (°C.) | Hazy Range (°C.) |
|---|---|---|---|
| HFC-134a Wt % | Fr # | | |
| 30 | 7 | −50 to 93 | — |
| 60 | 7 | −50 to 93 | — |
| 90 | 7 | −50 to 93 | — |
| 30 | 10 | −30 to 93 | —* |
| 60 | 10 | −50 to 93 | — |
| 90 | 10 | −50 to 93 | — |

*Schlieren lines ca −30 to 50° C.

EXAMPLE 7

Grafting of Hexafluoropropylene, HFP, to 2,2,4-Trimethyl pentane

A mixture of 2.5 g. of di-t-butyl peroxide, 50 g. of 2,2,4-trimethyl pentane and 200 g. of HFP were heated in a pressure vessel under autogeneous pressure for 3 hours at 135° C. and then for 12 hours at 140° C. The vessel was cooled to ambient temperature and the gaseous contents vented. The liquid product was distilled to remove 34.7 g. of unreacted 2,2,4-trimethyl pentane. The residue, 25.6 g. was a low viscosity graft of approximately 1.9 HFP/2,2,4-trimethyl pentane.

EXAMPLE 8

Grafting of perfluoropropyl vinyl ether PPVE $(CF_3-(CF_2)_2-O-CF=CF_2)$ to n-Dodecane $[C_{12}H_{26} + C_5F_{10}O \rightarrow C_{12}H_{26-x}(C_5F_{10}HO)_x]$ A mixture of 2.0 di-t-butyl peroxide, 26.6 g. of n-dodecane and 200 g. of PPVE were heated in a pressure vessel for 12 hours under autogeneous pressure at 140° C. and then cooled. The liquid products from the reactor were separated into two phases. The upper phase, essentially n-dodecane, was separated and the lower phase stripped of low boiling materials by distillation at a pot temperature up to 75° C. at ca. 0.08 Torr. The viscous residue, 140.3 g., was distilled through a short path distilling apparatus and the following fractions collected and characterized:

| Fr # | Bath Temp (°C.) | Press (Torr) | Wt (g.) | Composition (wt %) C | H | PPVE/DD[a] Mol Ratio C[b] | NMR[c] |
|---|---|---|---|---|---|---|---|
| 1 | 25−120 | 0.08 | 2.72 | — | — | | |
| 2 | 120−124 | 0.08−0.1 | 7.67 | — | — | | |
| 3 | 124−150 | 0.08−0.1 | 91.08 | 30.12 | 1.86 | 4.62 | 4.4 |
| 4 | 150−231 | 0.08−0.1 | 30.6 | 29.60 | 1.46 | 4.97 | 4.4 |

[a]PPVE/DD denotes number of PPVE grafts per dodecane molecule. These will be primarily as pendant $-CF_2-CFH-O-(CF_2)_2CF_3$ groups.
[b]PPVE/DD calculated from carbon analysis.
[c]PPVE/DD calculated proton magnetic resonance spectrum Visual viscosity increases: Fr4 Fr3 Fr2.

| Fr # | Viscosity SUS at 100° F. |
|---|---|
| 3 | 417 |
| 4 | 1882 |

A mixture of 6 g. of t-butyl peroxy peracetate (74–76% in odorless mineral spirits), 38 g. of n-decane and 100 g. of hexafluoropropylene were heated for 14 hours under autogeneous pressure at 85° C. The lower graft layer weighed 14.5 g. and contained approximately 1.6 HFP grafts/decane.

In the following tables, Tables II and III, are presented the miscibility data of HFC-134a with commercially available fluorinated oils and with some known refrigerant oils. It is apparent that none of them are completely miscible with HFC-134a in the refrigeration range of temperatures.

TABLE II

SOLUBILITY OF HFC-134a WITH COMMERCIAL FLUORINATED OILS
(Test Range 93° to −50° C.)

| Expt. No. | Lubricant | Miscible Range (°C.) for Indicated Concentrations (Wt. %) of HFC-134a | | |
|---|---|---|---|---|
| | | 30% | 60% | 90% |
| Control A | 500 SUS blend, Halocarbon 700/95−6.7/93.3 wt. % (a) | 93 to 8 | 93 to 7 | 93 to −4 |
| Control B | 150 SUS, Krytox ® GPL Blend (b,c) | 93 to 0 | 93 to 10 | 93 to 20 |
| Control C | 480 SUS, Krytox ® GPL Blend (b,c) | 93 to 10 | 93 to 20 | 93 to 20 |
| Control D | 417 SUS, Fomblin ® Y 25/5 (b,d) | 93 to 5 | 93 to 15 | 93 to 15 |
| Control E | 417 SUS Fomblin ® Z-15 (b,d) | 93 to 5 | 93 to 28 | 75 to 28 |
| Control F | 300 SUS Demnum ® S-65 (b,d) | 93 to 15 | 93 to 22 | 93 to 22 |

(a)Polychlorotrifluoroethylene oil. A product of Halocarbon Products Corporation.
(b)A perfluorinated poly alkyl ether oil
(c)A product of E. I. du Pont de Nemours and Co.
(d)A product of Montefluos, Division of Montedison Group
(e)A product of Daikin, Industries Ltd.

TABLE III

SOLUBILITY OF HFC-134a WITH AVAILABLE MISCELLANEOUS REFRIGERANT OILS

| Expt. No. | Expt. Dipentaerythritol Esters of Fatty Acids (c) | Miscible Range (°C.) for Indicated Concentrations (Wt %) of HFC-134a In Lubricant | | |
|---|---|---|---|---|
| | | 30% | 60% | 90% |
| Control G | 240 SUS | −50+ | −4+ | 40+ |
| Control H | 290 SUS | −44+ | −17+ | 70+ |
| | Expt. PEG Esters of Fatty Acids (d) | | | |
| Control I | 144 SUS | −21+ | 54(a) | 54(a) |
| Control J | 620 SUS | −4+ | 4+ | 70+ |
| Control K | 830 SUS | −6+ | 70+ | 70+ |
| | Naphthenic Oils (e) | | | |
| Control L | Suniso ® 5GS (500 SUS, 38% aromatic) | 54(a) | 54(a) | 54(a) |
| Control M | Witco 500 (500 SUS) | 54(a) | 54(a) | 54(a) |
| Control N | Expt. Oil (520 SUS, 47% aromatic) | 54(a) | 54(a) | 54(a) |
| Control O | Expt. Oil (529 SUS, 75% aromatic) | 54(a) | 54(a) | 54(a) |
| | Paraffin Oil (f) | | | |
| Control P | BVM-100N (500 SUS) | 54(a) | 54(a) | 54(a) |
| | Alkyl Benzene | | | |
| Control Q | Zerol 300 (300 SUS) (g) | 54(a) | 54(a) | 54(a) |
| Control R | DN600 (125 SUS) (h) | 54(a) | 54(a) | 54(a) |
| Control S | Atmos HAB15F (78 SUS) (i) | 55+ | Ins(b) | Ins(b) |
| | Silicone Oils | | | |
| Ctrls. T, | L-45 Oils (163, 231 | Ins(b) | Ins(b) | Ins(b) |

TABLE III-continued
SOLUBILITY OF HFC-134a WITH AVAILABLE MISCELLANEOUS REFRIGERANT OILS U, V    & 462 SUS) (j)

+ Soluble at and above shown temperature.
(a)Perhaps it is soluble somewhere above shown temperature.
(b)Completely insoluble from 93 to −50° C.
(c)Hercules
(d)CPI Engineering
(e)Witco Chemical Company
(f)BVM Associates
(g)Shrieve Chemical Company
(h)Conoco
(i)Nippon Oil KK
(j)Union Carbide

EXAMPLE 10
Grafting of Hexafluoropropylene, HFP, to Mineral Oil

This example illustrates the modification of a commercial hydrocarbon oil by grafting with hexafluoropropylene to introduce pendant $C_3F_6H-$ groups. Mineral oils are liquid hydrocarbons (usually alkanes) containing 15-20 carbon atoms, (as set forth in The United States DISPENSATORY, 27th Edition, p. 755). The viscosity increases as the number of carbon atoms increases.

Procedure:

A mixture of 50 grams of mineral oil* having a viscosity of 394 SUS at 100° F, 4.2 grams of di-t-butyl peroxide, and 200 grams of hexafluoropropylene (HFP) were heated sequentially under autogeneous pressure at 135° C. for 4 hours and 140° C. for 12 hours. The mixture was cooled and the unreacted HFP vented. The reactor contents, a heterogeneous mixture of grafts and unreacted mineral oil, was combined with a 200 ml acetone rinse of the reactor which was also heterogeneous. The HFP/mineral oil grafts were separated from the unreacted mineral oil by extractive procedures. *Nujol® Extra Heavy Grade manufactured by Plough, Inc.

The reaction mixture was diluted with ca. 200 ml. additional acetone and the layers separated. The lower layer was washed with 50 ml of acetone and concentrated in vacuo (100° C. at ca 25 Torr) to give 17.09 grams of colorless oil, A, which had an infrared spectrum identical to the starting mineral oil.

The upper pale yellow layer was concentrated in vacuo, as above, to given a heterogeneous pale yellow oil which still contained unreacted mineral oil according to the Infrared Spectrum. Further purification was achieved by extracting the mixture with 100 ml of octane and separating the layers. The lower layer was further extracted with 25 ml of octane and the octane extracts combined.

The lower layer was freed of octane by concentration in vacuo (100° C. at ca. 25 Torr.) to give a very viscous yellow oil, B, (17.88 grams) which was substantially free of mineral oil according to the Infrared Spectra.

Analysis for fluorine found 46.39% F indicating that the oil B contained ca. 61 wt.% HFP grafts.

Oil B can be converted to oils having viscosities useful as refrigeration oils by blending with lower viscosity oils described in previous examples, e.g. HFP/Octane Grafts made as in Example 5 having a viscosity of 116 SUS at 100° F.

| Blend | Oil B Wt. % | HFP/Octane Oil Wt. % | Viscosity SUS at 100° F. |
|---|---|---|---|
| I | 55 | 45 | 1719-1756 |
| II | 30 | 70 | 413 |

Concentration of the octane extracts gives again a heterogeneous mixture of oils (35.13 grams) which can be partially separated by centrifuging. The upper layer ca. 19.3 grams is mineral oil contaminated with some HFP/mineral oil grafts and lower layer ca. 14.8 grams is primarily HFP/mineral oil grafts, C, contaminated with some mineral oil. Oil C had a viscosity of ca. 400 SUS at 100° F. and contained 36.92% F.

What is claimed is:

1. A composition for use in compression refrigeration comprising:
   (a) a saturated hydrocarbon having 1-4 carbon atoms that is partially or fully substituted with at least one atom of chlorine or fluorine and having a normal boiling point in the range of −80° C. to +50° C.; and
   (b) a sufficient amount to provide lubrication of at least one fluorinated hydrocarbon comprising at least one graft of a perfluoroalkene or a perfluorovinyl ether onto at least one alkane having at least four (4) carbon atoms, the number of carbon atoms in the alkane and the number of grafts of the perfluoro compound being such as to provide a lubricant, having an SUS viscosity at 100° F. of at least 50.

2. The composition of claim 1 wherein component (a) is at least one compound selected from the group consisting of 1,1,2,2-tetrafluoroethane, 1,1,1,2-tetrafluoroethane and pentafluoroethane.

3. The composition of claim 2 wherein said alkane of component (b) is at least one selected from n-decane, n-dodecane, n-octane, cyclooctane, cyclododecane, and 2,2,4-trimethyl pentane.

4. The composition of claim 3 wherein said perfluoroalkene is hexafluoropropylene.

5. The composition of claim 3 wherein said perfluorovinyl ether is perfluoropropyl vinyl ether.

6. The composition of claim 1 wherein component (b) comprises at least one graft of a perfluoroalkene or a perfluorovinyl ether into at least one liquid hydrocarbon having 15-20 carbon atoms.

7. A lubricant adapted for use in compression refrigeration with a saturated hydrocarbon refrigerant having 1-4 carbon atoms that is at least one fluorinated hydrocarbon specified in claim 1 that has an SUS viscosity at 100° F. of at least 50 and a pour point of less than −10° C.

8. A method for lubricating compression refrigeration equipment using as the refrigerant a saturated hydrocarbon having 1-4 carbon atoms that is partially or fully substituted with at least one atom of fluorine or chlorine and has a normal boiling point in the range of −80° C. to +50° C. consisting essentially of using 10-50% by volume of the combination with said refrigerant of at least one fluorinated hydrocarbon specified in claim 1 that has an SUS viscosity at 100° F. of 100 to 1200 and a pour point of less than −10° C.

* * * * *